United States Patent [19]
Karubian et al.

[11] Patent Number: 5,503,594
[45] Date of Patent: Apr. 2, 1996

[54] CARCCASS CLEANING SYSTEM

[75] Inventors: Ralph K. Karubian, Los Angeles, Calif.; John A. Leamen, Omaha, Nebr.

[73] Assignee: Kentmaster Mfg. Co., Inc., Monrovia, Calif.

[21] Appl. No.: 378,534

[22] Filed: Jan. 25, 1995

[51] Int. Cl.⁶ ................................................ A22C 17/08
[52] U.S. Cl. ............................. 452/173; 15/321; 15/420
[58] Field of Search ................... 452/173, 71, 75, 452/77, 102, 103, 104; 15/321, 322, 344, 345, 353, 420, 246

[56] References Cited

U.S. PATENT DOCUMENTS

| | | | |
|---|---|---|---|
| Re. 26,950 | 9/1970 | Hays | 15/321 |
| 1,982,345 | 11/1934 | Kirby | 15/321 |
| 3,883,301 | 5/1975 | Emrick et al. | 15/321 |
| 4,074,387 | 2/1978 | Arato et al. | 15/322 |
| 4,649,594 | 3/1987 | Grave | 15/321 |
| 4,949,424 | 8/1990 | Shero | 15/321 |

FOREIGN PATENT DOCUMENTS 29570 of 1910 United Kingdom ..................... 15/420

*Primary Examiner*—Willis Little
*Attorney, Agent, or Firm*—Allan M. Shapiro

[57] ABSTRACT

As a carcass moves down the conveyor in a meat processing plant, it may carry contaminants from an earlier processing step. The surface is sterilized, and the contaminants are removed by simultaneous delivery of steam to the surface and vacuuming away of the steam. A sterilizing hot water spray is controlled by a valve so that the operator may deliver it to particular spots that need more cleaning.

20 Claims, 2 Drawing Sheets

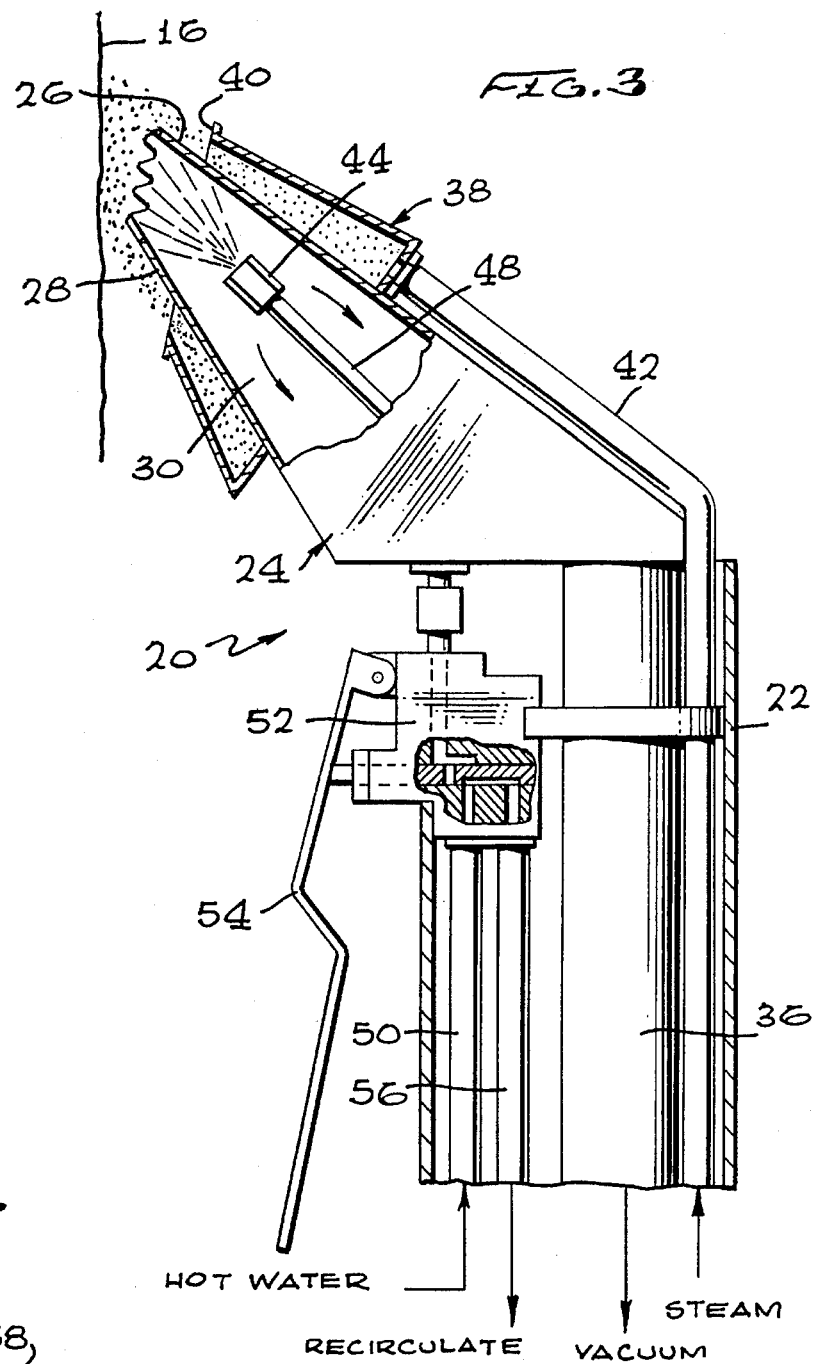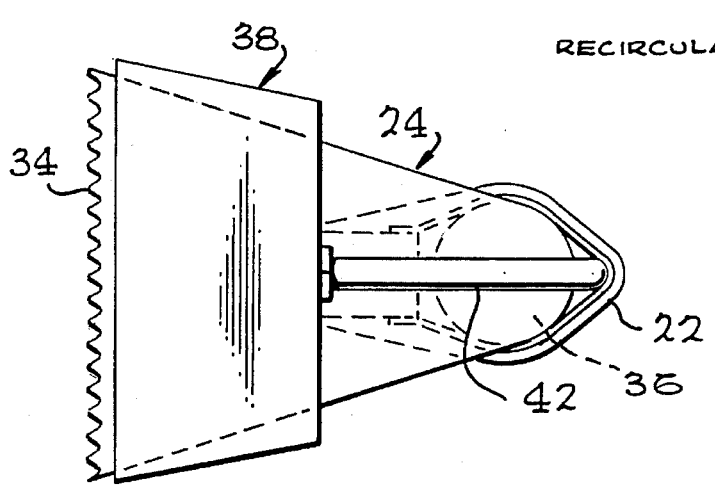

CARCCASS CLEANING SYSTEM

FIELD OF THE INVENTION

This invention is directed to a carcass cleaning system where the manually operable head applies steam and simultaneously vacuums off the steam and contaminant.

BACKGROUND OF THE INVENTION

Animals are killed to produce commercial meat, such as beef, lamb and pork, and are hung on a conveyor so as to move along a processing line. On the conveyor, the killed hanging animal is gutted and skinned as early processing steps. The resulting carcass moves forward along the processing line, but may carry contamination on the surface of the carcass from earlier processing steps such as the process of hide removal where hair and mud can fall off onto the carcass.

The present requirement of the U.S. Department of Agriculture is to cut off the surface material upon which the contamination lies. This requires individual handwork and results in loss of otherwise useful meat and/or fat material from the carcass.

The U.S. Department of Agriculture does not approve of washing down the contamination off of the carcass because this process spreads the contamination and/or bacteria in it. High-pressure spray would deteriorate the meat and spread the contamination. Vacuum alone is not satisfactory because it leaves some of the contamination and/or bacteria behind.

SUMMARY OF THE INVENTION

In order to understand this invention, it is stated in essentially summary form that it is directed to a carcass cleaning system which has a manually positionable wand. The wand simultaneously delivers a bath of steam onto the carcass surface and vacuums away the steam, its condensation products and contamination.

It is thus a purpose and advantage of this invention to provide a carcass cleaning system which removes the contamination from the surface of a carcass without spreading the contamination.

It is another purpose and advantage of this invention to provide a carcass cleaning system which is easily operable and which can be conveniently employed on a meat processing line to be selectively applied to the surface of the carcass to remove contamination therefrom.

It is a further purpose and advantage of this invention to provide a carcass cleaning system which effectively removes contamination from the surface of the carcass without loss of carcass material.

It is another purpose and advantage of this invention to provide a carcass cleaning system wherein the surface of the carcass in a limited area is bathed in steam delivered from a manually operable wand, and the wand also carries a vacuum nozzle which draws away the steam condensation products, contamination and the balance of the steam.

It is a further purpose and advantage of this invention to provide a wand having a vacuum nozzle within a steam nozzle and supplied with a water nozzle within the vacuum nozzle so that the water nozzle sterilizes the inside of the vacuum nozzle and can deliver a spray of water onto difficult to remove contamination.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 3 is a side-elevational view of the wand which is used for cleaning the surface of the carcass, with parts broken away and parts taken in section.

FIG. 4 is a top view of the wand.

DESCRIPTION OF THE PREFERRED EMBODIMENT

Figure 1:
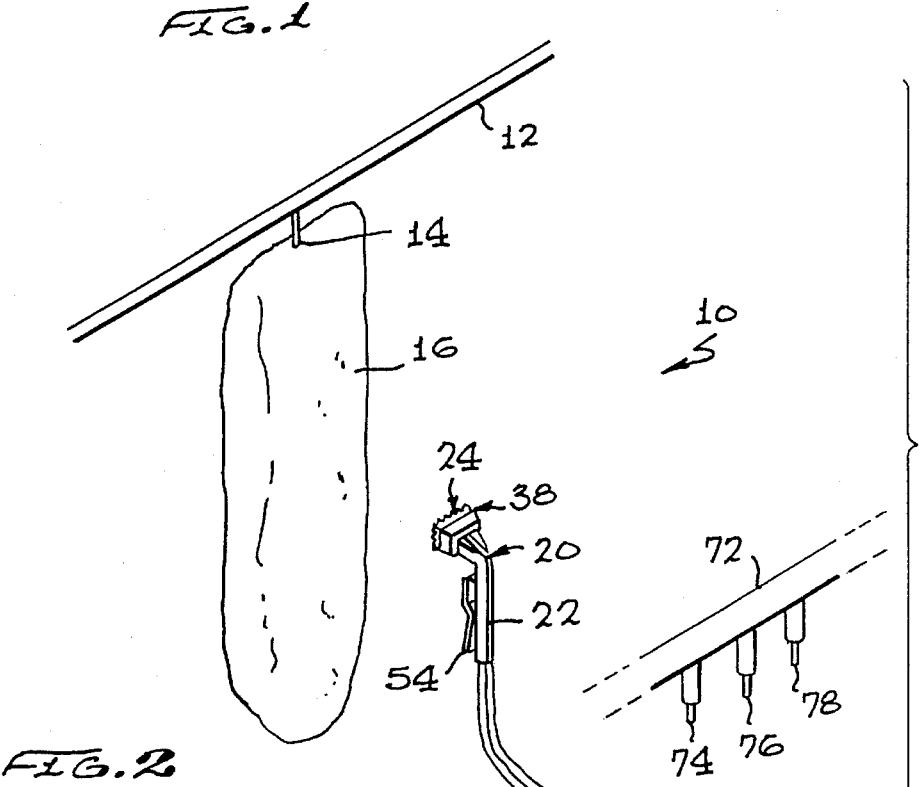
FIG. 1 is a perspective view of a meat processing line at the carcass cleaning section showing the carcass cleaning system of this invention as useful therein.

The carcass cleaning system of this invention is generally indicated at 10 in FIG. 1. FIG. 1 illustrates a portion of the process line in a commercial meat processing facility. Conveyor 12 has a plurality of trolleys which are moved therealong at a desired rate. Trolley 14 carries carcass 16. It is understood that the carcass and trolley represent one of a plurality of such moving from right to left from earlier process steps and moving along to later process steps. The portion of the conveyor shown passes through the work area where the skinned carcass is to have contaminants removed from the surface thereof. In the past, the contaminants, for example, hair, mud and dirt with their usual bacteria, were removed by cutting away the surface material which carries the contaminants. In accordance with this invention, the system 10 removes the surface contamination and disinfects the surface of the contaminated carcass.

The carcass cleaning system comprises a power unit 18 which delivers process fluids to and removes process fluids from the wand 20. The wand 20 is manually moved to bring these process fluids to the contaminated surface of the carcass and remove the fluids and contaminants therefrom.

Figure 5:
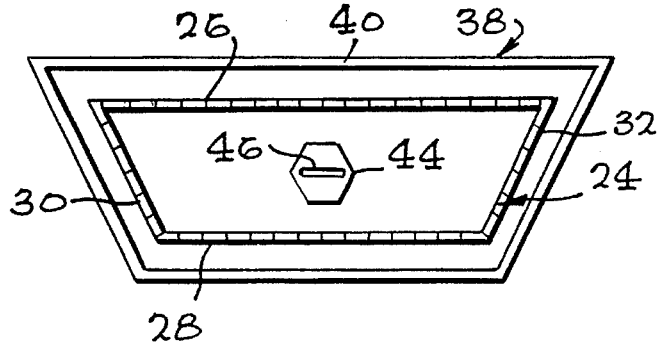
FIG. 5 is a face view of the wand.

The wand 20 is seen in side elevation, with parts broken away and parts taken in section, in FIG. 3. The wand has a grip tube 22 which is sized to be grasped in the hand. Attached to the grip tube is vacuum hood 24. The vacuum hood has a trapezoidal opening, as is seen in FIG. 5. The top and bottom walls 26 and 28 are substantially parallel, while the side walls 30 and 32 slope toward each other, with them closer at the bottom so that the bottom wall 28 is shorter than the top wall 26. These walls are all scalloped at the edge. Scallops 34 are shown in FIG. 4. The purpose of the scallops is to prevent the vacuum hood from vacuum-locking onto the surface of the carcass. The vacuum hood 24 is attached to vacuum tube 36.

Surrounding the vacuum hood 24 is steam hood 38. The face of the steam hood has the same outline as the vacuum hood, but is larger and is uniformly spaced therefrom, as seen in FIG. 5. Furthermore, steam hood 38 is mounted on the outside of the vacuum hood, and its lip 40 is short of the scalloped edge 38 of the vacuum hood. When the scalloped edge of the vacuum hood is in contact with the carcass 16, the lip of the vacuum hood is spaced from the carcass. The spacing of from one-half to one inch of the lip 40 of the steam hood behind the scalloped edge of the vacuum hood is sufficient to prevent the vacuum hood from coming into contact with the carcass. The scalloped edge serves the purpose of allowing entry of surrounding material into the vacuum hood to prevent locking up of the vacuum hood against the surface of the carcass. However, the more important reason for these serrations is to draw the steam surrounding the vacuum hood into the vacuum hood even when the scalloped edge is against the surface of the carcass.

Surrounding the vacuum hood with steam and vacuuming the steam through the scalloped edges into the vacuum hood accomplishes the primary purpose of cleaning the surface of the carcass in most conditions. However, for the most difficult contamination conditions, it is helpful to also spray the surface of the carcass with hot water. In addition, it is important to continuously clean the vacuum hood so that cross contamination between successive carcasses is eliminated. In order to provide these two additional functions, a spray nozzle 44 is provided within the vacuum hood, as seen in FIGS. 3 and 5.

As seen in FIG. 5, the spray opening 46 of the spray nozzle is rectangular to deliver a spray which is wider than it is high to wash down all the interior walls of the vacuum hood 24. In addition, the nozzle opening is directed out of the front of the vacuum hood so that it impinges water onto the surface of the carcass as limited by the configuration and size of the scalloped edge opening of the vacuum hood.

Hot water is supplied to nozzle 44 through tube 48. The supply of hot water from supply tube 50 to nozzle tube 48 is controlled by valve 52. The valve has a manually operable valve actuating handle 54. The valve 52 is shown in the unactuated position of FIG. 3, and in this position, the supply tube 50 is connected to return tube 56, which permits recirculation of the hot water so that heated water is always present at the valve. When the valve actuating handle 54 is actuated, the return tube is closed and the supply tube supplies hot water to the nozzle tube 48. When the hot water is supplied under pressure, a spray is emitted from spray nozzle 44.

As seen in FIG. 3, the spray nozzle sprays the inside of the vacuum hood as well as sprays out of the opening in the vacuum hood. Grip tube 22 contains the various tubes therein so as to protect the operator from the tubes which may be hot from the hot material therein. The tube 22 is sized so that the operator can grasp it and use his fingers on valve handle 54. A bundle of flexible tubes is connected to the tubes 36, 42, 50 and 56 passing through the grip tube. This bundle is seen as bundle 58 and is connected to power unit 18, which supplies the needs.

The wand 20 is grasped by the operator and taken to the surface of the carcass. The approach is seen in FIG. 3, which shows the steam extending forward and around the vacuum nozzle. The vacuum nozzle is moved over the surface, in contact with the surface, and is surrounded by steam. The scalloped edge of the vacuum nozzle is moved over at least the contaminated areas of the surface. The flow of steam loosens the contamination, and all steam condensation and contamination is drawn away by the vacuum nozzle. In particularly difficult parts to clean, the operator can actuate valve 52 to spray the surface defined by the face of the vacuum hood. The spray water is fully contained within the confines of the vacuum hood when it is bearing against the carcass. If desired, the spray water can be left on during the entire cleaning operation and turned off only when the wand is moved away from the carcass.

The cleaning solution is principally water and preferably has an antiseptic therein, such as vinegar or other mild acids of types known to kill bacteria, such as acetic, citric and lactic acids, none of which is toxic to humans in dilute solutions. The water is heated so that, as it leaves the nozzle and impinges upon the vacuum hood walls and carcass, it has a temperature greater than 161° F., such as 180° F. more or less. It is known that 161° F. is a critical temperature for the usual bacteria encountered in carcass processing. With this temperature range, the meat is not discolored by excess temperature. The pressure is low so that the cleaning solution impinges only on the surface of the meat and does not penetrate or damage the meat. It is also desirable that the pressure be low so that the driving of bacteria into the surface material by means of a water jet is avoided. Furthermore, the meat would absorb water if there were sufficient pressure or temperature to the water. Absorption and surface driving force is to be avoided to prevent transporting bacteria into the material.

Figure 2:
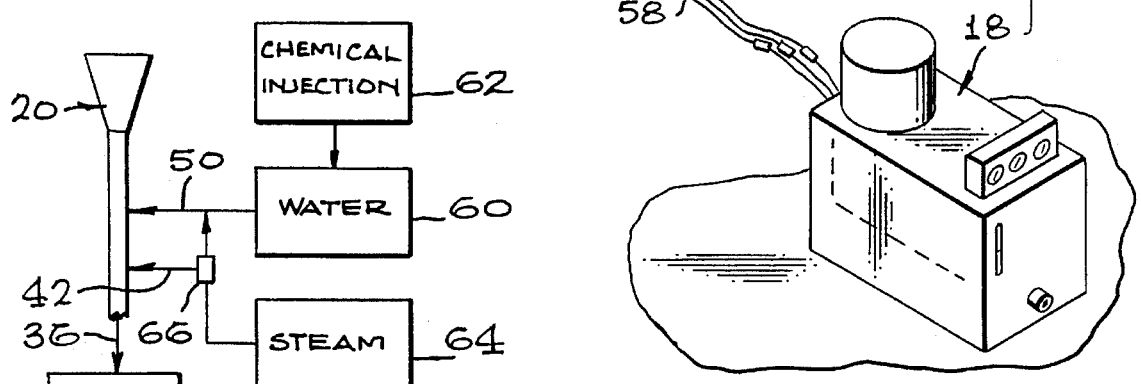
FIG. 2 is a block diagram of the system, showing some of the functions of the system.

The power unit 18 supplies the fluid needs through the hose bundle 58. As seen in FIG. 2, water is supplied from water source 60. The water source 60 is provided with a suitable pump to provide the water at a proper pressure for the nozzle configuration. Antiseptic material may be added to the water from antiseptic tank 62, as described above. The recirculating water in tube 56 is returned to the water supply 60. The water is heated and may be heated from the steam source 64, which delivers steam to hot water tube 50 through valve 66. This supply of steam to the water tube may be supplemental heating or may be primary heating, as desired. The power unit 18 also has a vacuum pump 68 thereon to withdraw the materials through the vacuum hood. The materials withdrawn in this manner are disposed of in the contaminate disposal system 70, which is separate from the power unit and which is conventionally available in meat processing plants. If the facility in which the meat processing is accomplished is supplied with the right process streams, the wand can be connected by flexible hose to a manifold. Manifold 72 extends through portions of the facility and has connections 74, 76 and 78 thereon respectively for hot water under pressure connection, steam under pressure connection, and vacuum connection. Such utilities can be conveniently supplied from a central location.

It is important to note that, in normal practice, it is necessary to dip into sterilizing solution any tool which comes in contact with successive carcasses. This is to prevent the contamination of an earlier carcass reaching a later one. In the present case, the spray of hot water into the interior of the vacuum hood overcomes this chance of carrying contamination forward. While the spray of water may not be necessary to remove contamination, the water spray must be turned on between successive uses on successive carcasses in order to achieve the sterilization of the vacuum hood.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A carcass cleaning system comprising:

a carcass cleaning wand which can be manually maneuvered to the surface of a carcass to be cleaned;

a vacuum hood on said wand, said vacuum hood being defined by walls, with at least some of said walls being defined by an uneven edge so that said vacuum hood does not lock onto a surface by vacuum, means connected to said vacuum hood for drawing vacuum on said hood to draw materials between said walls of said hood toward said vacuum means;

a steam hood positioned adjacent said vacuum hood for delivering steam around said vacuum hood at its uneven edge, means connected to said steam hood for supplying steam to said hood; and means for sterilizing said vacuum hood so that contamination is not carried thereon.

2. The carcass cleaning system of claim 1 wherein said means for sterilizing comprises a hot water spray nozzle configured and positioned to spray water on the interior of said walls of said vacuum hood.

3. The carcass cleaning system of claim 2 wherein said spray nozzle is directed so that at least some of the water sprayed therefrom sprays out of the opening of said vacuum hood to impinge on a carcass against which said vacuum hood lies so as to aid in cleaning of the carcass.

4. The carcass cleaning system of claim 3 further including a source of hot water under pressure and including a valve on said wand, said source of hot water under pressure being connected to said valve and said valve being connected to said nozzle so that actuation of said valve sprays hot water from said nozzle.

5. The carcass cleaning system of claim 4 wherein said valve has a manually actuatable handle on said wand so that the operator can move said wand and actuate said handle to spray water, as desired.

6. The carcass cleaning system of claim 3 wherein said uneven edge of said vacuum hood is a scalloped edge.

7. The carcass cleaning system of claim 3 wherein said steam hood surrounds said vacuum hood and has a lip defining the front edge of said steam hood, said vacuum hood extending through said steam hood and past said lip.

8. The carcass cleaning system of claim 7 wherein said uneven edge of said vacuum hood is a scalloped edge.

9. The carcass cleaning system of claim 5 wherein said valve has a recirculation return tube connected thereto and said valve is internally configured so that in the unactuated position, hot water passes through said valve to said return tube so that hot water is circulated through said valve.

10. The carcass cleaning system of claim 6 wherein said walls define a trapezoidal shaped opening of said vacuum hood.

11. A carcass cleaning system comprising:

a wand, said wand being manually manipulatable to the surface of a carcass to clean the surface of the carcass;

a vacuum hood on said wand, said vacuum hood having walls defining an opening in said vacuum hood, said walls terminating in an uneven edge so that the vacuum hood does not become suction locked onto a surface, means for connecting vacuum to said vacuum hood to draw a vacuum at said opening of said vacuum hood;

a steam hood mounted on said wand and positioned to deliver steam around said vacuum hood so that steam is delivered to the surface of a carcass to be cleaned and the steam is suctioned away together with contaminants on the surface into said vacuum hood, means for connecting steam to said steam hood; and means for sterilizing by hot water spray the interior of said vacuum hood so as to prevent contamination from being retained in said vacuum hood.

12. The carcass cleaning system of claim 11 wherein said steam hood surrounds said vacuum hood, said steam hood having an opening and an edge defined by a lip, said vacuum hood extending through said opening and past said lip so that said lip is positioned away from a carcass surface.

13. The carcass cleaning system of claim 12 wherein said uneven edge of said vacuum hood is a scalloped edge.

14. The carcass cleaning system of claim 12 wherein said means for sterilizing by hot water spray for cleaning the interior walls of said vacuum hood is hot water delivered by a nozzle within said vacuum hood, and further including means for supplying hot water under pressure.

15. The carcass cleaning system of claim 14 further including means for supplying hot water under pressure and a valve between said means and said nozzle, said valve being controlled by a manually actuatable handle on said wand so that the operator of said wand can spray sterilizing water as required.

16. The carcass cleaning system of claim 15 wherein said nozzle is directed to spray out sterilizing water against the interior walls of said vacuum hood and through the opening in said vacuum hood to impinge upon an adjacent carcass surface in order to further clean the adjacent carcass surface, with the steam, contaminants and water being substantially vacuumed away by said vacuum hood.

17. The carcass cleaning system of claim 16 wherein said uneven edge of said vacuum hood is a scalloped edge.

18. The carcass cleaning system of claim 16 wherein said valve is mounted on said wand and said manually actuatable handle is directly connected to said valve.

19. The carcass cleaning system of claim 18 further including a water return tube connected to said valve, said valve being configured so that when in the unactuated position, water flows from said source of hot water to said return tube to maintain flow through said valve in both the actuated and unactuated positions.

20. The carcass cleaning system of claim 11 wherein a power unit is connected to said wand by flexible connectors, said power unit providing hot water and steam to said wand and providing vacuum to draw water, steam and contaminants from said wand.

\* \* \* \* \*